Figure 1:
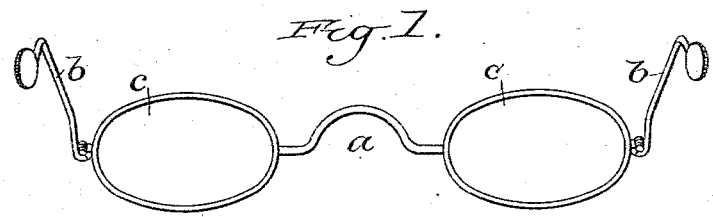

(No Model.)

C. MARSH.
SPECTACLES AND EYEGLASSES.

No. 305,944. Patented Sept. 30, 1884.

Witnesses:
Charles J. Schoener.
Chas. E. Dickey.

Charles Marsh
Inventor:
By Albert P. Guilbert Atty

UNITED STATES PATENT OFFICE.

CHARLES MARSH, OF READING, PENNSYLVANIA.

SPECTACLES AND EYEGLASSES.

SPECIFICATION forming part of Letters Patent No. 305,944, dated September 30, 1884.

Application filed April 11, 1884. (No model.)

*To all whom it may concern:*

Be it known that I, CHARLES MARSH, of the city of Reading, in the county of Berks and State of Pennsylvania, have invented new and useful Improvements in Spectacles and Eyeglasses; and I hereby declare the following to be a full, clear, and exact description thereof, reference being made to the accompanying drawings, forming a part of this specification.

My invention relates to improvements in the mode of holding spectacles and eyeglasses in position; and it consists of a pair of short spring arms or bows joined by hinges to and at right angles with the frames and lenses. The arms or bows are curved or turned upward and backward, so that when in position by reason of the spring of the arms or bows the tips or disks at the ends of the arms or bows press slantingly upon the temporal region of the wearer, and thus the spectacles or eyeglasses are firmly held in position without the assistance of a spring at the bridge or nose piece, or the use of the inconvenient long arms or bows, generally in use, extending to or around the ears. The lens-frames may be bent slightly backward, and the spring thus made in the lens-frames will press the tips or disks at the ends of the short arms or bows upon the temporal region of the wearer.

The object of my invention is to hold the spectacles or eyeglasses firmly in position by the pressure caused by the spring of the arms or bows, and also of the lens-frame. The arms or bows being turned upward and backward, as shown in the drawings, press the tips or disks at the ends of the arms or bows slantingly upon the temporal region of the wearer, and thus avoids both the necessity of having any spring or tightness at the nose or bridge piece, and the inconvenience and annoyance of the longer arms or bows, generally in use, extending back to or around the ears. The arms or bows must be bent or turned upward and slantingly backward, as shown in the drawings, in order to press, fit, and hold the tips or disks at the ends of the short arms or bows upon the temporal region of the wearer. If the arms or bows were continued at right angles to the plane of the lenses, the tips or disks at the ends of the short arms or bows would rest upon or below the cheek-bone, and in such case the frames would not be held firmly in place. The short arms or bows may be bent or turned upward and backward, as shown in the drawings, or may be turned upward and backward at an angle from the hinges, the object being to so bend or turn the short arms or bows that the tips or disks at the ends of the short arms or bows shall press upon the temporal region of the wearer. The tips or disks at the ends of the arms or bows may be flattened and corrugated upon the inner surfaces, and may be made of rubber, cork, felt, metal, or other suitable material.

Figure 2:
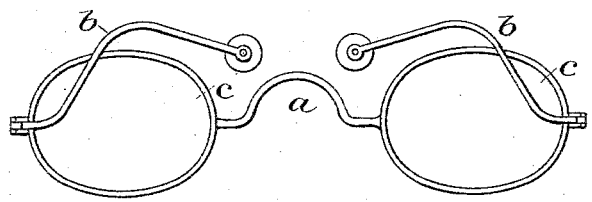

In the accompanying drawings, Figure 1 shows the spectacles or eyeglasses with the arms opened. *a a* represent the nose or bridge piece. *b b* represent the short spring arms or bows, and *c c* represent the lens-frame and lenses. Fig. 2 shows the spectacles or eyeglasses with the arms closed.

I am aware that eyeglasses and spectacles have been constructed with short arms at right angles to the frames or lenses, and having pads formed out of the material of the bow itself by coiling its ends into volutes, and also that eyeglasses and spectacles have been constructed with short arms at right angles to the frames, so as to be held upon the temples of the wearer by the tension of a semi-circular spring or nose-piece connecting the two lenses. I do not, therefore, claim, broadly, the combination, with the spring nose-piece, of short arms at right angles to the frames; nor do I claim providing short arms or bows with tips or disks at the ends, but limit myself to short arms or bows turned upward and backward, so as to rest their tips upon the temporal region just back of the super-orbital ridge of the wearer.

Having thus described my invention, I claim as new and desire to secure by Letters Patent—

The combination of the frame and lenses *c*, the bridge-piece *a*, and the angular-shaped arms or bows *b*, hinged to the frame and extending backward a short distance, and thence inclining upwardly, so as to rest their ends slightly in the rear of the super-orbital ridge, as herein set forth.

CHAS. MARSH.

Witnesses:
A. B. EHST,
D. D. BECKER.